Figure 1:
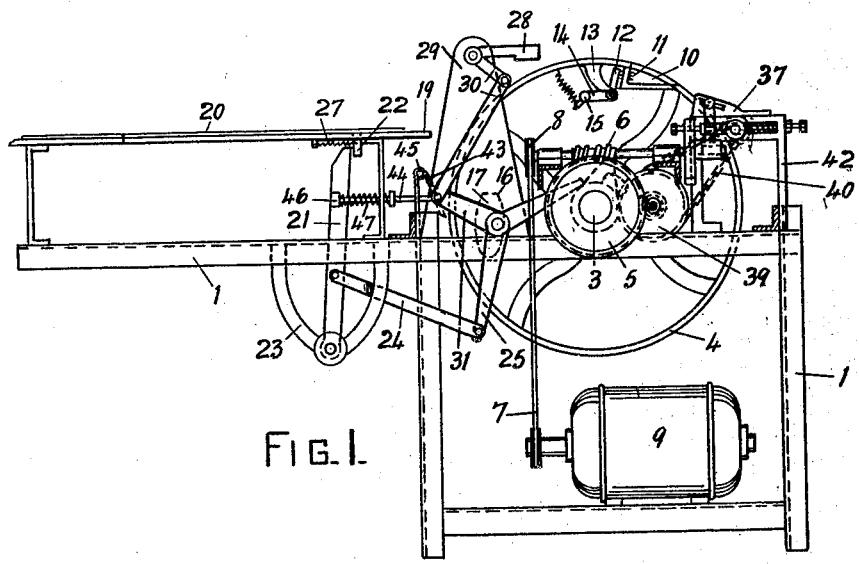

July 12, 1932.    J. D. BISSET    1,867,133

FISH SKINNING MACHINE

Filed April 15, 1931

Inventor:
John David Bisset
By Williams, Bradbury, McCaleb & Hinkle
Attys.

Patented July 12, 1932

1,867,133

UNITED STATES PATENT OFFICE

JOHN DAVID BISSET, OF ABERDEEN, SCOTLAND

FISH-SKINNING MACHINE

Application filed April 15, 1931, Serial No. 530,217, and in Great Britain April 16, 1930.

This invention relates to an improved fish-skinning machine of the class in which the fish is carried against a skinning knife.

The present invention consists in a fish-skinning machine of the class described in which a series of sharp hooks, teeth or pins are located in a depression in the surface of the carrier to engage the tail of the fish and carry it against the knife.

The invention also consists in a fish-skinning machine comprising a fish carrier, means thereon for engaging the tail of the fish and for carrying it against a skinning knife, and a drawing roller which is positioned immediately behind the knife and is rotated in contact with the fish skin in such a direction as to draw the skin from under the knife.

According to the present invention the fish carrier may be a rotating drum, an endless moving belt or a flat moving table having a series of sharp hooks, teeth or pins located in a depression in its surface, a knife being disposed transversely across the surface of the fish carrier and adjusted to allow the fish skin to pass between the knife and the carrier. Immediately behind the knife is a drawing roller which is rotated in contact with the fish skin at a greater surface speed than the carrier. A device or means may be provided for withdrawing the hooks or pins from the tail of the fish or for drawing the fish tail off the hooks or pins after the fish tail has passed clear of the roller.

In one form of machine according to my invention, the fish carrier moves beneath a stiff or rigid knife reciprocated across the surface of the carrier, and a sliding feed table is provided at the front of the carrier. The fish are placed on the feed table and are automatically delivered by the feed table to the hooks on the carrier. A presser or other device operating above the surface of the carrier is moved downwards automatically at the required moment and presses the fish tail on to the hooks of the carrier, whereupon the presser or like device returns to its normal position.

Scrapers may be provided for removing the skins from the carrier after they have passed beneath the drawing roller. The scrapers may be reciprocated across the surface of the carrier.

The machine may be belt-driven or provided with its own electric motor or other power drive.

A feature of the present invention is that the tail of the fish is not gripped between gripping jaws, but is caught or hooked by the aforesaid hooks or pins, which take a firm hold of the fish and which operate noiselessly as compared with the operation of movable gripping jaws.

In order that the invention may be more clearly understood, reference is hereinafter made to the accompanying drawing, illustrating one form of construction, in which Fig. 1 is a sectional side view of a fish skinning machine according to the invention, taken on the line 1—1 of Fig. 2.

Figure 2:
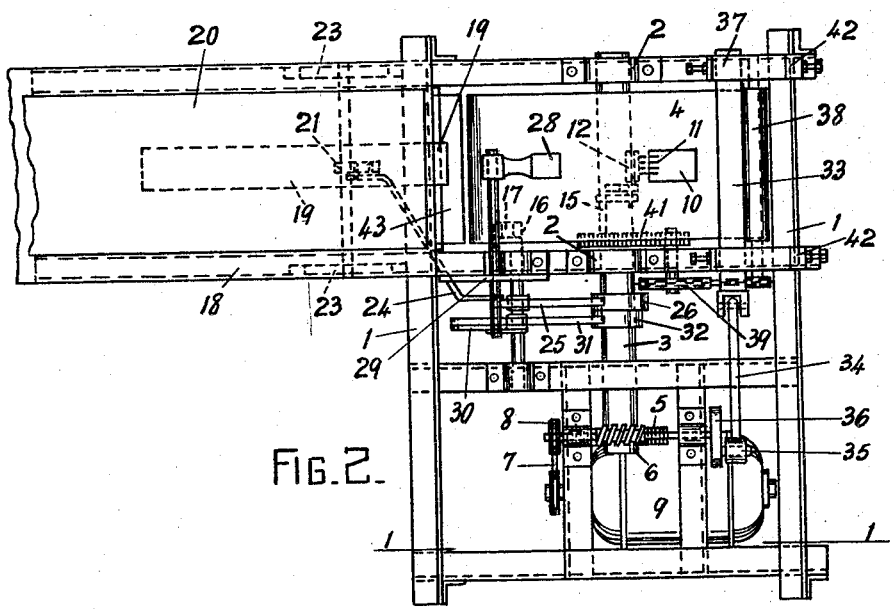

Fig. 2 is a plan view of the machine.

The machine as shown comprises a frame 1 carrying bearings 2 which support a rotating shaft 3 on which is fixed a drum 4. The shaft 3 is rotated by means of a worm wheel 5 mounted on the shaft 3 and engaged by a worm 6 driven by a belt 7 and pulley 8 from an electric motor 9.

The drum 4 is provided with a depression or recess 10 in its surface, the recess 10 being provided with apertures through which project a series of needles 11 adapted to engage the tail of the fish. The needles 11 are carried by a member 12 pivotally mounted on a bracket 13 on the inner periphery of the drum 4, the member 12 having an extension 14 provided with a projection 15 adapted to engage the face 16 of a fixed cam 17 mounted in a suitable position on the frame 1. When the projection 15 engages the cam 17 the needles are withdrawn into the drum 4 and thus release the tail of the fish.

A compound sliding feed table 18 is provided at the front of the drum 4, the table comprising two sliding surfaces 19 and 20, the sliding surface 19 being adapted to support the tail of the fish, and extending outwards from the edge of the surface 20 towards the drum 4, and the surface 20 supporting the body of the fish. Both surfaces 19 and 20 are moved towards the drum 4 by means of a lever 21 engaging a projection 22 on the sliding surface 20, the lever being pivoted to brackets 23 on the frame 1 and operated by a link 24 connected to one arm of a bell crank 25, the other arm of which engages a cam 26 on the shaft 3. When the surface 19 reaches the drum, it is checked and the other surface 20 continues until it reaches the drum so that the tail of the fish is projected into the recess 10 in the drum. The surface 19 is connected to the surface 20 by means of a spring 27 which allows the surface 20 to slide towards the drum 4 after the surface 19 has stopped.

A presser 28 pivotally mounted on a bracket 29 is moved downwards at the required moment to press the fish tail on to the needles 11. The presser 28 is operated by means of links 30 which are connected to one arm of a bell-crank 31, the other arm of which engages a cam 32 on the revolving shaft 3.

A stiff or rigid knife 33 arranged at the back of the drum 4 is reciprocated across the drum by means of a connecting rod 34, one end of which is connected to the knife and the other end to a crank pin 35 on a crank disc 36 mounted on the shaft carrying the worm 6. The knife 33 is reciprocated in guides 37 which can be adjusted to allow the fish skin to pass between the drum 4 and the knife.

Immediately behind the knife 33 is mounted a roller 38 which is driven by means of sprocket wheel 39 and chain 40 from a gear wheel 41 on the shaft 3. The roller 38 is driven at a greater surface speed than the drum 4 so as to draw the skin from under the knife 33, and is adjustably mounted in brackets 42 on the frame 1.

A scraper 43 is provided for removing the fish skin from the drum 4 after the skin has passed clear of the roller 38. This scraper 43 may be in the form of a metal blade or comb pivotally hung at 45 from brackets on the frame 1, the blade or comb 43 being pressed against the drum by a rod 44 connected to the lever 21 which operates the feed table. The rod 44 moves through a bearing 46 on the lever 21 and is fitted with a spring 47 to permit movement of the lever 21 and to press the rod 44 yieldingly against the drum.

The table surfaces 19 and 20 are provided with springs or other means (not shown) which return the surfaces to their initial position when the fish has been engaged by the needles. The bell-cranks 25 and 31 may also be provided with springs or other means to keep their ends in constant contact with the cams 26 and 32.

Claims:

1. In a fish-dressing machine, a fish carrier, tail-engaging members located in a depression in the surface of said carrier, a compound feed table comprising two slidable surfaces, one extending further towards the carrier than the other to support the fish tail and the other supporting the fish body, means for moving both table surfaces together towards the carrier, and means for checking the tail-carrying surface while motion of the other table surface continues towards the carrier.

2. In a fish-dressing machine, a rotary drum having a depression in its cylindrical surface, a series of needles movable through the wall of said depression, a needle holder pivoted within the drum, spring means acting on said holder to normally project the needles, a lever movable with the needle holder, and a cam stationary within the drum for cooperating with said lever to momentarily retract the needles.

3. In a fish-dressing machine, a travelling conveyor, tail-engaging members in the surface of said conveyor, a main reciprocatory feed table, a tail support mounted on said table and projecting further towards the conveyor than the table, means for moving said table towards the conveyor, resilient means interposed between the tail support and table to enable the table to continue its movement towards the conveyor after the tail support has been stopped by contact with the conveyor, and means for returning the table.

4. A fish-skinning machine comprising a rotary drum having a depression in its cylindrical surface, a series of needles movable through the wall of said depression, a needle holder, a reciprocatory feed table, a knife transversely mounted over the drum, means for rotating the drum and for reciprocating the knife transversely across the drum, and means for reciprocating the feed table and needle holder in timed relationship to the rotation of the drum.

5. A fish-skinning machine as specified in claim 4 having a roller behind the knife, means for rotating the roller at a greater surface speed than the drum and in the opposite direction thereto, a scraper mounted transversely across the drum in rear of the roller, and means for reciprocating the scraper across the drum.

In testimony whereof I affix my signature.

JOHN DAVID BISSET.